US006705687B1

(12) United States Patent
McGraw

(10) Patent No.: US 6,705,687 B1
(45) Date of Patent: Mar. 16, 2004

(54) STORAGE AND DISPLAY UNITS FOR CARDS AND THE LIKE AND METHODS OF MAKING SAME

(76) Inventor: Bruce Arnold McGraw, 937 Flintrock Dr., Antioch, CA (US) 94509-6982

( * ) Notice: Subject to any disclaimer, the term of this patent is extended or adjusted under 35 U.S.C. 154(b) by 0 days.

(21) Appl. No.: 09/751,034

(22) Filed: Dec. 29, 2000

Related U.S. Application Data

(60) Provisional application No. 60/174,142, filed on Dec. 31, 1999.

(51) Int. Cl.[7] ................................................. A47F 1/00
(52) U.S. Cl. ............................................ 312/60; 312/50
(58) Field of Search ............................. 312/35, 42, 58, 312/59, 60, 61, 71, 34.4, 34.7, 321.5, 293.3, 111, 107; 211/49.1, 58

(56) References Cited

U.S. PATENT DOCUMENTS

| | | | | |
|---|---|---|---|---|
| 380,877 A | * | 4/1888 | Fellows | 211/55 |
| 455,770 A | * | 7/1891 | Smith | 206/749 |
| 1,734,031 A | * | 11/1929 | Carlson | 312/40 |
| 1,786,392 A | * | 12/1930 | Kemp | 312/42 |
| 2,225,958 A | * | 12/1940 | Mandel | 312/111 |
| 2,728,623 A | * | 12/1955 | Foerstner | 312/321.5 |
| 3,927,809 A | * | 12/1975 | Klein, Sr. | 224/196 |
| 5,720,547 A | * | 2/1998 | Baird | 312/107 |
| 6,095,624 A | * | 8/2000 | Wilbert | 312/293.3 |

* cited by examiner

*Primary Examiner*—Lanna Mai
*Assistant Examiner*—Jerry Anderson
(74) *Attorney, Agent, or Firm*—D. D. McGraw

(57) ABSTRACT

A storage and display unit for prepaid telephone calling cards, collectible cards, and the like which is made, at least in a major part, of a substantially transparent plastic having a reasonable amount of impact resistance to breakage, the unit being combinable with other units to assemble larger units, the unit providing one or more bins holding cards that are for sale, with the cards in view through the transparent portions of the unit, and arranged to have a key-lockable cover to at least deter unauthorized removal of cards. The unit also provides for display of a card's face to indicate the type of card in each card bin. The display can be arranged to be on the front or back of the unit, or both. When on the back, the unit is best oriented so that the display card seen through the transparent unit back is facing customers, and the locked cover is facing the clerk or other salesperson who has a key and is authorized to remove cards for sale. When the display card is also on the locked cover, it provides quick visual identification of the various cards in various bins. Individual units, having one or several bins, can be attached in horizontal or vertical array, or both, to form larger display units having more bins. Processes for making and assembling the units are also disclosed, preferably using a thermoplastic material which is heated at bend points to become pliable, and bent to combine what would otherwise be several individual unit panels into one piece. A jig for heating and bending a blank patterned part is also schematicly disclosed.

9 Claims, 3 Drawing Sheets

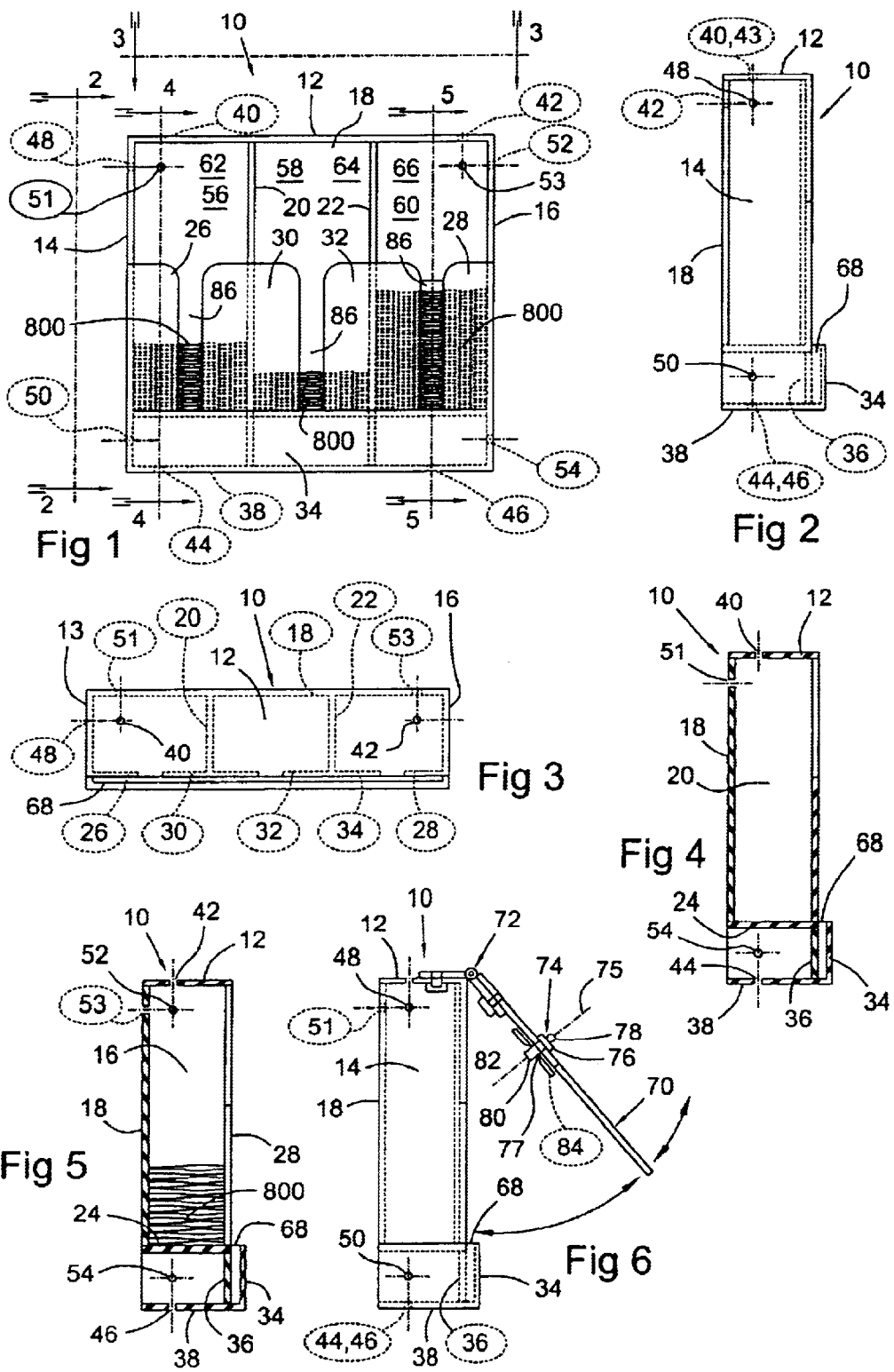

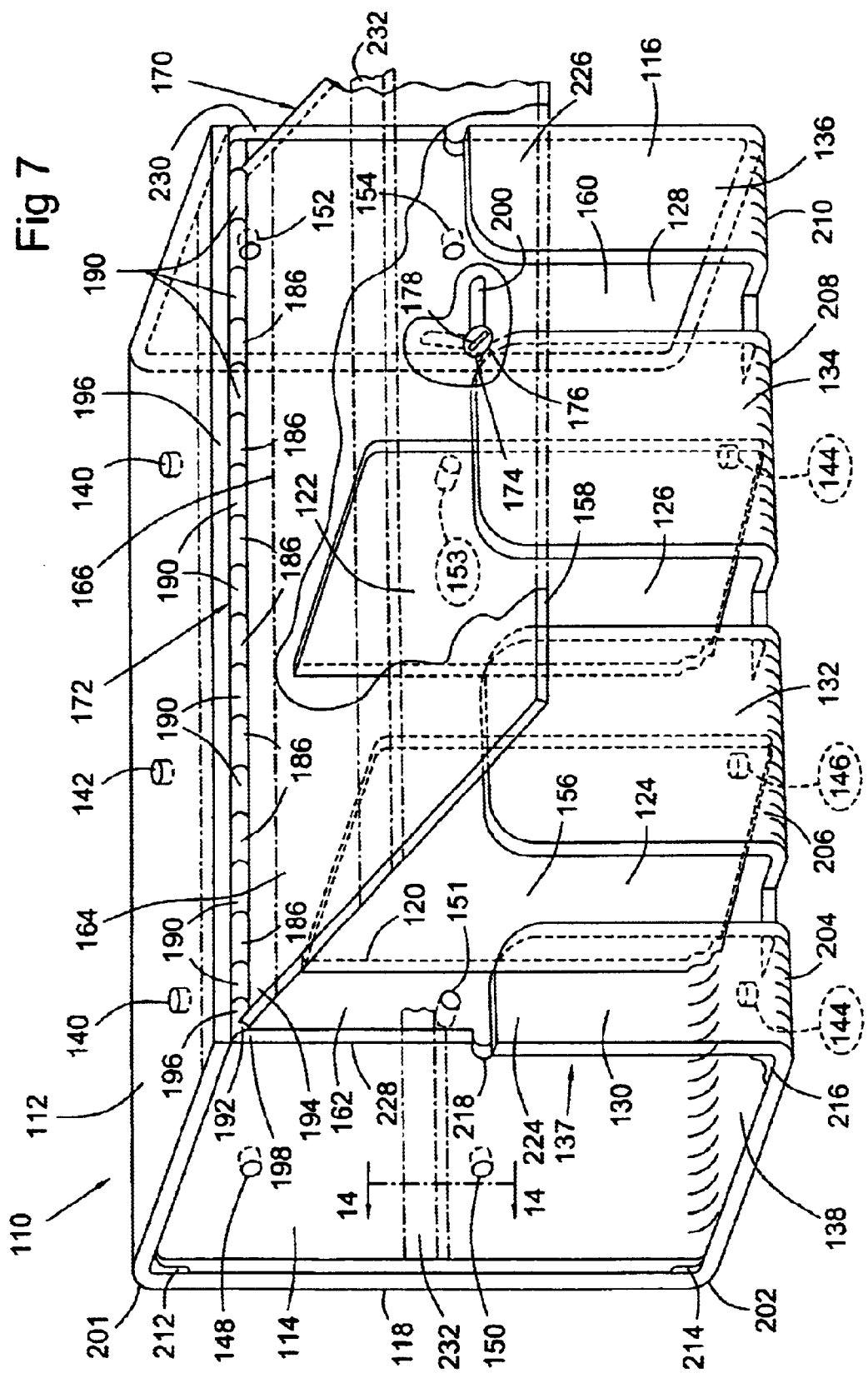

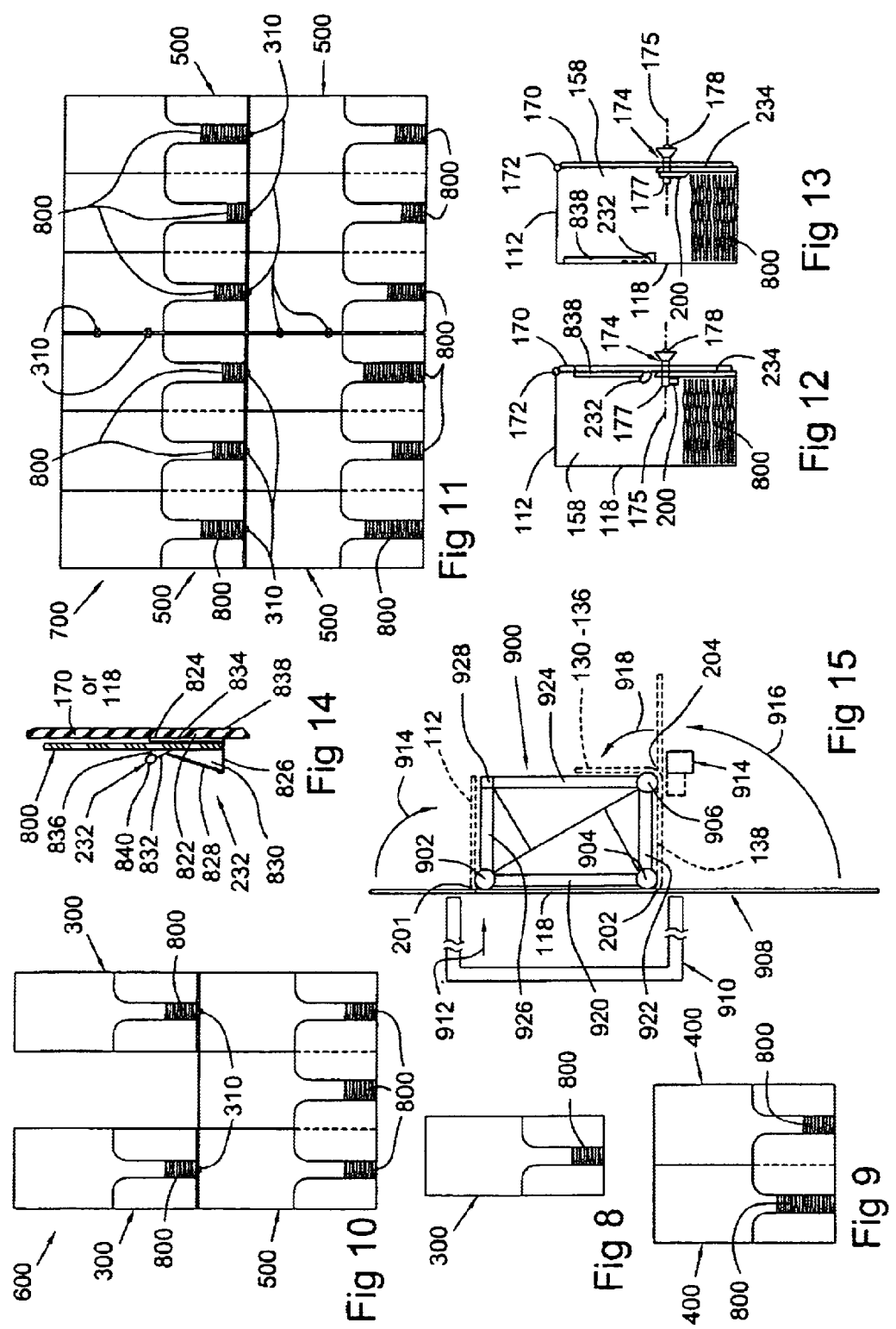

STORAGE AND DISPLAY UNITS FOR CARDS AND THE LIKE AND METHODS OF MAKING SAME

CLAIM OF PRIORITY

The priority benefit of the disclosures in U.S. Provisional Patent Application Serial No. 60/174,142, filed Dec. 31, 1999, now abandoned by the same inventor of the invention or inventions in this application, is hereby claimed.

BACKGROUND OF THE INVENTION

Units are used to store cards sold over-the-counter by merchants. Cards such as prepaid telephone cards are commonly so sold. Other types of cards such as collectibles featuring sports persons can also be stored and sold in units of this general type.

Typical storage and display units that have been in use for some time are simple cardboard containers which may contain numerous cards or packages containing one to several cards. There are some which are made of thin sheets of relatively brittle plastic, open so as to place the cards in a readily accessible position, creating the possibility of easy removal by customers without paying for them.

Also, those card-holding units known to the inventor herein which are made of plastic are of such thin material that they are easily cracked and broken when dropped, not only destroying the container but also scattering its contents over the floor or other adjacent surfaces. None known to this inventor provide the combination of excellent presentation of cards for identification with the safety of a sturdy unit which is lockable so that cards in it are accessible only to the salesperson and not to the customers.

SUMMARY OF THE INVENTION OR INVENTIONS DISCLOSED

Broadly, the invention or inventions disclosed herein are directed to storage and display units providing card bins for visible storage of cards which are readily accessible for removal as cards are sold, and providing space for a card of the type as contained in each card bin for displaying the card, and the methods of making such units. Units are preferably made of a material such as high density polyethylene, rendering it much more resistant to the currently commonly used cardboard units when it is accidentally dropped. They may also be made of well-known acrylic material. Units embodying the invention provide arrangements for holding the cards and accessing them when a sale is being made, providing easy access so that the sales person no longer needs to pick up the entire unit to retrieve a card, thus making it much less likely that the unit will be dropped. Experience has shown that this is a continuing problem with current card holding units. Each individual unit embodying the inventon is so constructed that a plurality of units may be attached together to form a larger unit having more storage bins and capable of various configurations. The units may be attached in vertical or horizontal alignment or in a combination of both alignments. Thus a single unit may become part of a larger compound unit comprised of two or more single units. Units may be secured to a wall, shelf, counter or other device, including pegboard, for example, so that the units are not free-standing and therefore tempting sales persons, or others, to pick up the entire unit. However, they may also be used as free-standing units when desired.

The invention includes products and processes of making same which are the subject of this utility patent application, and designs which may be the subject of one or more design patent applications.

Therefore, one of the objects of the invention is to provide a storage and display single unit for holding and displaying cards and the like for sale and adapted to be attached to other of said similar single units to form a multi-unit storage and display unit. Such a single unit comprises a unit body having a bottom, a back side, a top, left and right side panels, and a front side. The front side has at least one generally T-shaped opening having an upper part extending across at least a portion of the front side and a lower part extending downwardly from the opening upper part so as to terminate at least near the unit body bottom. The T-shaped opening is defined by spaced parts of the front side and opens into the interior of the unit and defines the front of a bin in which a number of cards may be installed therein by insertion through the opening so as to lie flat in the bin in a stack, and may be removed by insertion of a finger inserted through the downwardly extending lower part of the T-shaped opening to lift one or more of the cards upwardly in the bin and then outwardly through the across-extending upper part of the T-shaped opening.

A more specific object of the invention is to make a single unit of the above-described type of a substantially transparent plastic such as Plexiglass™ and similar acrylics, nylon, high density propylene, Lucite™, etc., so that any cards displayed therein may be visually discernible from the exterior of said single unit. When the term "substantially transparent" is used, it means that an object in facing near-engagement or actual engagement with one side of a plastic part can be readily identified and any words thereon read through the plastic. It therefore will include clear as well as colored plastic so long as it permits such objects to be seen as above described.

Still another object of the invention is the provision of either a single bin in one unit or a plurality of bins arranged side-by-side within a unit.

Yet another object of the invention is the provision of a single unit that has divider panels located intermediate its left and right side panels. Such intermediate divider panels are secured to back, bottom and front and cooperate with the back, bottom and front to define a plurality of said bins, each of the bins having a T-shaped opening as earlier described so that different cards may be stored, displayed in and selectively removed from different bins. Any particular single unit may be made with anywhere from one bin to as many bins as may be desired. However, for convenience, it is usually best to provide anywhere from one bin to about four or five bins as a typical maximum, and to simply attach two or more single units together if more bins are desired. It has been found to be somewhat optimum to provide three bins per unit, but the invention is not limited to that number.

Another object of the invention is to provide a cover hinged to the top of a unit for swingable movement from a vertical position, in which the one or more T-shaped openings, depending upon the number of bins, are covered by the cover, to an open position in which the one or more T-shaped openings are at least sufficiently open and uncovered by the cover so as to permit the installation and removal of cards into and from the one or more bins. It is also preferable that the cover has a key-operated security lock thereon with a movable locking bar movable about the lock axis by key action only from an unlocked position to a locked position and back to an unlocked position, the locked position being such position that the lock axis extends through a T-shaped opening and the locking bar engages the bin interior side of at least one of the spaced parts of the front defining the T-shaped opening while the cover is in its vertical position covering the T-shaped opening. The lock bar is also movable by the key lock to a position wherein it is disengaged from the at least one of the spaced parts of the front defining the T-shaped opening and is in alignment with a part of the T-shaped opening so as to permit the cover to be swung to its position wherein the T-shaped opening, or openings in the case of a plurality of bins having been provided, is uncovered to permit the installation and removal of cards into and from the one or more bins. The lockable and unlockable cover thus keeps the cards secure from inadvertent or intentionally impermissible removement from any bin.

Another object of the invention is to provide fastener-receiving openings through the top, bottom and side panels arranged in such matching relation that two or more of the single units may be secured together by fastener means extending through aligned ones of the openings in either vertical or horizontal relation to form a larger unit made up of a plurality of individual single units.

Yet another object of the invention is to have the lock bar extending to only one side of the lock axis so as to be engageable with and disengageable from only one of the at least one of the spaced parts of the unit front defining a T-shaped opening. The lock bar is rotated only about 90° in arc from its engageable position to its disengageable position so that, as the cover is raised, the lock bar exits the bin through the vertical part of the T-shaped opening. Alternatively, the bar may extend to both sides of the lock axis so as to be engageable with and disengageable from both of the two spaced parts of the front defining the T-shaped opening. Such a lock bar then is rotated about 180° in arc from its engageable position to its disengageable position when the unit is to be unlocked. If desired, the bar may be formed substantially as a semi-circle and in its unlocked position is above the lock axis when it is in the unlocked position so as to be in alignment with the T-shaped opening upper part and in disengageable relation with the spaced parts of the front side defining the T-shaped opening. When it is in its locked position it extends below the lock axis so as to be in engageable relation with both of the two spaced parts of the front side defining the T-shaped opening, preventing swinging movement of the cover to uncover the T-shaped opening as well as any other T-shaped openings for additional bins.

In any of these locking arrangements, only one lock and lock bar is required to lock a cover over several bins if the unit has several bins.

Another feature of the invention which may be used is the provision of a card-retainable strip secured to the cover on the side thereof facing the bin or bins when the cover is covering all T-shaped openings, permitting one side of a card retained therein to be visually observed by a customer through the transparent cover while the cover covers the T-shaped openings. Any cards in the one or more bins are accessible to a clerk because the one or more bins are openable only by a clerk having a key for operating the key lock, thereby providing security against unauthorized removal of a card from any bin. Alternatively or in addition, a card-retainable strip may be secured to the unit back on the side thereof facing the bin or bins, permitting one side of a card retained therein to be visually observed through the transparent back, so that the back may be the side of the unit seen by a customer and the closed cover being the side being accessible to a clerk and openable by a clerk having a key for operating the key lock, thereby providing greater security against unauthorized removal of a card from any bin. This latter arrangement is very desirable when the unit is sitting on a counter top with the customer on one side and a clerk on the other side.

Another feature of the invention is the provision of a card-retainable strip secured to unit back and/or to the cover on the side thereof facing the bin, permitting one side of a card retained therein to be visually observed through the back or the cover, or both. When such a card is visible through the back, the back may be the side of the unit seen by a customer and the closed cover being the side being accessible to a clerk and openable by a clerk having a key for operating the key lock, thereby providing greater security against unauthorized removal of a card from said bin. When there is a card visible through the back and another one of the same issue visible through the closed cover, both the customer and the clerk have an opportunity to quickly identify the cards in the particular bin relating to those cards. When there is a card visible through only the closed cover, the customer can still identify the particular in that related bin, and if there are such cards placed to be seen through the closed cover for each bin covered by the cover, the customer can see all of them and make a choice as to the card he prefers. The clerk can then either move the unit around so that the closed cover faces him, and then unlock it to remove the card of the customer's choice, or be on the same side of the unit as the customer, and so remove the card selected.

A feature that may be incorporated in a unit described above is the provision of a second bottom located below the unit bottom, with the back and side panels and front extending below the unit bottom and having the second bottom secured thereto to provide a storage shelf openable through one of the back panel and front extensions on the back or front of said unit so as to have access to the storage shelf only on the side thereof which is oriented to face a clerk and not a customer.

Another object and feature of the invention is the provision of larger storage and display unit formed by a combination of single units which are secured together by fastening means extending through aligned ones of said openings formed in one or more of the side panels and the top and the bottom.

More specifically, such a larger unit may be formed by a combination of single units which are secured together by fastening means extending through at least some of the openings formed in the sides, top and bottom of two adjacent ones of such single units that are aligned with each other for the passage of fastening means therethrough.

A more specific object of the invention is the provision of a larger storage and display unit formed by a combination of a plurality single storage and display units secured together, at least a first one of the single storage and display unit comprising a unit body having a bottom, a back side, a top, left and right side panels, and a front side, the front side having at least one generally T-shaped opening having an upper part extending across at least a portion of the front side and a lower part extending downwardly from the opening upper part so as to terminate at least near to the unit body bottom, the T-shaped opening being defined by spaced parts of the front side and opening into the interior of the unit and defining the front of a bin in which a number of cards may be installed therein by insertion through the T-shaped opening so as to lie flat in the bin. One or more of these cards may be removed by insertion of a finger inserted through the downwardly extending lower part of the T-shaped opening to lift one or more of the cards upwardly in the bin and then outwardly through the across-extending upper part of the T-shaped opening. The top, bottom and side panels have fastener-receiving openings therethrough arranged in such matching relation that two or more of the single units may be secured together in either vertical or horizontal relation to form a larger unit made up of a plurality of the single units. At least a second one of the single storage and display units more specificly comprises another of the first one of the single storage and display units having divider panels located intermediate the unit's left and right side panels and secured to the unit back, bottom and front. These divider or intermediate panels cooperate with the back, bottom and front to define a plurality of bins, each of these bins having a T-shaped opening as described above so that different cards may be stored, displayed in and selectively removed from different bins. Also, each of the single storage and display units has a hinged lockable cover having a closed position covering the T-shaped openings of that unit. This cover is movable to an unlocked open position wherein the T-shaped openings of that unit are uncovered to provide access to the unit's bins through the T-shaped openings to permit the insertion and removal of cards into and out of the bins. Thus the particular overall appearance and arrangement of such a larger storage and display unit is controlled at least in part by the number of bins in each of single storage and display units, the placement of various single storage and display units relative to each other, and the material of which any particular single storage and display unit is made.

The invention also includes various processes or methods of making units of the type described above. These processes or methods include:

A first process of making and assembling a storage and display single unit of a type above described comprising the steps of:

(1) creating a first planar pattern for the bottom, back side and front side; (2) precisely cutting a single substantially transparent plastic part from a planar sheet of plastic having a thermoplastic pliable characteristic permitting bending of the plastic part at controlled bending radii under controlled applied heat; (3) bending the single plastic part under controlled applied heat applied at the areas thereof joining the bottom to the back side and to the front side at controlled radii of bending so that the planes of the back side and the front side are parallel in spaced relation to each other and are perpendicular to the plane of the bottom; (4) cooling the single plastic part to cool the material thereof at the points thereof having had applied heat until the single plastic part is stable in the parallel and perpendicular relationships set forth and is no longer thermoplasticly pliable so as to be bendable as was done in step (3); (5) creating a second planar pattern for the left and right side panels; (6) precisely cutting the left and right side panels from a planar sheet made of the same plastic as the single plastic part was cut; and (7), after step (4) has been completed, securing the left and right side panels to the single plastic part to provide closed side panels with at least one interior bin so enclosed.

It is within the purview of the invention to heat the single plastic part at the pliable bending areas through pipes conducting a heated liquid or gaseous material, or heated rods which may be internally heated electricly or externally heated, or by applying heat from the exterior of the single plastic part on the side thereof opposite the jig's bending pipes or rods; and to cool the pliably heated and bent parts of the single plastic part by forced cold air cooling, flowing cooled liquid or gaseous material through the jig pipes after the pliable bending steps have been completed so as to cool the pipes and through them cool the bent areas of the single plastic part, exposing the entire now-bent single plastic part, with or without the jig, in a liquid or gaseous cooling bath, or allowing it to be air-cooled so that it is no longer thermoplasticly pliable.

Also, a further detailed process of the above first process, here identified as a second process, in which (1) the fifth step of the above first process also includes creating a pattern for one or more intermediate panels; (2) the sixth step of the above first process also includes precisely cutting the one or more intermediate panels from said planar plastic sheet; (3) and the seventh step of the above first process also includes attaching the one or more intermediate panels in spaced relation between the left and right side panels to define therewith and with any adjacent two intermediate panels two or more interior bins adapted to hold cards.

Another more detailed process relating to the process identified above as the second process, and here identified as a s third process, in which (1) the first step of the above-identified first process also includes a top; (2) the third step of the above-identified first process also includes heating and bending the single plastic part at the area thereof joining the back side to the top so that the planes of the bottom and the top are parallel and are perpendicular to the plane of the back side; (3) the fifth step of the above-identified first process also includes creating a pattern for one or more intermediate panels; (4) the sixth step of the above-identified first process also includes precisely cutting the one or more intermediate panels from the planar sheet; and (5) the seventh step of the above-identified first process also includes attaching the one or more intermediate panels in spaced relation between the left and right side panels to define therewith and with any adjacent two intermediate panels two or more interior bins.

Still another more detailed process of the above-identified third process, here identified as the fourth process, in which the following additional steps are performed: (6) providing a plastic panel of the same material as the other panels as a cover for the front side of the storage and display unit; and (7) providing a hinge along one edge of the cover panel and securing same to the cover panel and also to the top in such a position that the top is movable along the axis of the hinge from a vertical position in which the unit front side is covered to a position where the one or more bins are sufficiently uncovered to be able to insert and remove cards into and from the one or more bins.

Still another more detailed process of the process of identified above as the fourth process, in which the following additional step is performed: (8) attaching a card-retainable strip to at least one of the back side and the cover, on the bin interior side thereof in a manner wherein when one or more cards are retained therein in such position that they can be seen in relation to the bin or bins with which they are generally aligned to provide an external view of one side of the one or more cards as a visual indication of the cards that would be in the one or more bins.

BRIEF DESCRIPTION OF THE DRAWING

FIG. 1 is a front elevation view of a first type of unit embodying the invention.

FIG. 2 is as side view of the unit of FIG. 1 taken in the direction of arrows 2—2 of that FIGURE.

FIG. 3 is a top view of the unit of FIG. 1 taken in the direction of arrows 3—3 of that FIGURE.

FIG. 4 is a cross-section view of the unit of FIG. 1 taken in the direction of arrows 4—4 of that FIGURE.

FIG. 5 is a cross-section view of the unit of FIG. 1 taken in the direction of arrows 5—5 of that FIGURE.

FIG. 6 is a view similar to FIG. 2 showing a modification of the unit of FIG. 1 in which a movable cover, provided with a locking mechanism, is attached to the basic unit to cover the bins of the unit and secure the contents from removal.

FIG. 7 is a perspective view of a second type of unit embodying the invention.

FIG. 8 is a simplified schematic front elevation view of a single bin single unit which is otherwise similar to the unit of FIG. 7.

FIG. 9 is a simplified schematic front elevation view of a double bin single unit which is otherwise similar to the unit of FIG. 7.

FIG. 10 is a simplified schematic front elevation view of a larger unit composed of a single unit such as that shown in FIG. 7 in combination with two single units such as that shown in FIG. 8.

FIG. 11 is a simplified schematic front elevation view of a larger unit composed of a combination of four single units such as that shown in FIG. 7.

FIG. 12 is a simplified schematic cross section view, such as that view identified by arrows 12—12 on FIG. 10, of any one of the units of FIGS. 7 and 8–11 when the covers of those units, like the unit of FIG. 7, are installed with cover locks. This FIGURE shows a card-holding strip such as one of the card-holding strips shown in FIG. 7 being attached to the inner side of the cover and containing a card therein.

FIG. 13 is a simplified schematic cross section view, such as that view, also identified by arrows 12—12 on FIG. 10, of any is one of the units of FIGS. 7 and 8–11 when the covers of those units, like the unit of FIG. 7, are installed with cover locks. This FIGURE shows a card-holding strip such as one of the card-holding strips shown in FIG. 7 being attached to the inner side of the unit back panel and containing a card therein.

FIG. 14 is a cross section view, with parts broken away, taken in the direction of arrows 14—14 of FIG. 7, showing a card-holding strip secured to the inner surface of a unit back, and illustrating the manner in which a card-holding strip may be also secured to the lower or inner, surface of the cover of a unit.

FIG. 15 is a simplified schematic illustration of a jig that can be used to bend a flat sheet patterned part to make a unitary combination of the top, bottom and front of the unit shown in FIG. 7.

DETAILED DESCRIPTION OF THE DISCLOSURE

The unit 10 shown in the drawing FIGS. 1–6 is a three-bin unit which will accommodate the three most common telephone card denominations of $5, $10 and $20 in United States currency. In FIGS. 8 through 13, described later, cards in any bin of any unit are identified by the reference character 800. In other countries, of course, they will accommodate cards 800 of their most common denominations. The unit may be made of several parts which are secured together in a suitable manner such as gluing or plastic welding, or the unit may be integrally injection molded either as a single part or, when cost of mold design or other factors dictates, is only two or three parts (and seldom more, although that can be done within the purview of the invention). When units are made by injection molding, the edges and corners may be rounded to accommodate mold requirements, and such rounding will also contribute to the attractiveness of the unit.

Unit 10 has the following parts, it being understood that some or all of these parts may be encompassed in an integrally injected molding or in formed unit sections: a top 12, vertically positioned sides 14 and 16, a vertically positioned back 18, vertically positioned interior panels 20 and 22, internal bottom 24, front card retention panels consisting of two end panels 26 and 28 and intermediate panels 30 and 32, a card front display panel 34, a card back display panel 36, and a bottom 38.

The top 12 has holes 40 and 42 extending therethrough at a predetermined precise location distance relative to the outer surfaces of sides 14 and 16 as well as the outer surface of back 18. By way of example, the precise location distance can be one inch from the referenced surface to the center line of each hole.

Similar holes 44 and 46 are provided in the bottom 38 so that holes 40 and 44 are in alignment, and holes 42 and 46 are also in alignment, to be able to insert bolts therethrough to assemble one unit 10 on the top of another unit 10 and attach them together to form a larger unit. This precise location distance is preferably the same as the above-described previous location distance for the holes 40 and 42 in the top 12.

Side 14 has holes 48 and 50, and side 16 has holes 52 and 54, extending therethrough at a precise location distance from their upper and lower end edges and from their back edges so that holes 48 and 50 of one unit are respectively aligned with holes 52 and 54 of another unit, to be able to insert bolts or other well-known fasteners therethrough to assemble one unit 10 to the side of another unit 10 and attach them together to form a larger unit. Back 18 has holes 51 and 53 in its upper corners, similarly located at the precise location distance. These holes are provided for mounting unit 10 to a wall or pegboard or other vertical surface.

Units may be assembled and fastened together both vertically and horizontally to form larger units having three, four or more individual units, as may be desired. FIGS. 8–12 show some such arrangements. This can be desirable when different brands of cards 800 are being sold, for example, or in the case of collectible cards, many more can be displayed and readily available for sale.

Each bin interior 56, 58 and 60 has a horizontal cross section area which will accommodate the particular cards 800 being sold. For example, typical telephone cards 800 currently being marketed are about 3.5 inches by 2.5 inches; therefore the bin interiors are only slightly larger than that. The card retention panels 26, 28, 30 and 32 extend upward from the interior bottom 24 a sufficient distance to hold many cards 800 in each bin while leaving the upper portions 62, 64 and 66, respectively, of the interiors 56, 58 and 60 of each bin sufficiently open to permit the manual loading of a stack of cards 800. Each pair of panels 26 and 30, 30 and 32, and 32 and 28 are respectively spaced apart by a distance best determined at that which will readily admit the insertion of a sales person's thumb and a finger to grip a single card 800 and remove it by lifting it upwardly until it can be removed through the upper portion 62, 64 or 66 of the bin containing the card 800 being removed. A typical spacing width between adjacent panels can be about 0.8 inch to 1.2 inches for this purpose. The panels 26, 28, 30 and 32 prevent any of the cards 800 stored within the bins behind the panels from sliding out.

The vertically open spaces 86 between the display panel sections 26, 30; 30, 32; and 32, 28 are preferably about 0.5 inch less in height than the width of a typical card 800 of the type being displayed and sold. When such typical telephone cards 800 are being sold, this height would be about 2 inches. This permits the card 800 being displayed by being inserted into space 68 to extend sufficiently above the upper edge of panel 34 to be grasped through a space 86. Spaces 86 are finger slots, allowing one or more cards 800 to be readily grasped for removal as needed. The card 800 so placed in space 68, as well as those stacked above for sale, can be readily seen and identified since panel 34 is preferably clear or tinted but substantially transparent plastic.

One modification of the unit 10, providing a lockable cover, is shown in FIG. 6 which can be added to any individual unit when the vendor requires it. The cover 70 is suitably attached by either a piano hinge, as later shown in FIG. 7, or a plurality of individual hinges 72 to the unit top 12. Cover 70 is preferably of a size to cover substantially all of the front portions of the bin interiors 56, 58 and 60. The locking mechanism 74 is schematically shown as a lock portion 76 operated by a key 78 controlling a shaft 80 which has a substantially semi-circular lock arm 82 secured thereto. In the unlocked position, lock arm 82 is positioned above the axis 75 of shaft 80 as shown in solid lines in FIG. 6. It is also positioned above the finger slot 86 formed by the adjacent edges of panels 30 and 32. When the key 78 is turned, it moves the lock shaft 80 about 180 degrees of arc so that the semi-circular lock arm is moved to a position behind both panels 30 and 32, and the lock is secured in this position. The key then is removed. The stack of cards 800 in the bin interior 58 must always be sufficiently low so that the locking arm does not engage the top card 800 of the stack. To open the cover, the key 78 is inserted in the lock portion 76, turned 180 degrees, and the cover 70 is released. It is then pivoted on its hinge(s) so as to rest over the unit top 12. A lock mechanism of the type identified as mechanism 174 of FIG. 7 may be used. Only the specific design of the lock arm is different.

FIG. 7 shows a modified, second type, of unit 110 which is made of considerably less total parts while having the same physical advantages of the units of FIGS. 1–6. Unit 110 can be described using substantially the same parts descriptions used above in describing the units of FIGS. 1–6. To that extent, the following description follows that format, with the differences in construction method and in the details of the various parts then being set forth.

Unit 110 has the following parts, it being understood that some or all of these parts may encompassed in an integrally injected molding or in formed sections: a top 112, vertically positioned sides 114 and 116, a vertically positioned back 118, vertically positioned interior panels 120 and 122, and a bottom 38.

The top 112 has holes 140 and 142, with two such holes 140 which are similarly placed and one such hole 142 which is placed between the two holes 140 and out of line with them. Holes 140 and 142 extend through top 112 at a predetermined precise location distance relative to the outer surfaces of sides 14 and 16 as well as the outer surface of back 18. By way of example, the precise location distance for holes 140 can be one inch from the referenced surface to the center line of each hole, with hole 142 placed equidistant from the two holes 140 and laterally displaced so as to be nearer the back panel 118 than those holes.

Similar holes 144 and 146 are provided in the bottom 138 so that the two pairs of holes 140 and 144 are in alignment, and the two holes 142 and 146 are also in alignment, to be able to insert bolts or other suitable fasteners, such as fasteners 310 of FIGS. 10 and 11, therethrough to assemble one unit 110 on the top of another unit 110 and attach them together to form a larger unit. This precise location distance is preferably the same as the above-described previous location distance for the holes 40 and 42 in the top 12.

Side 114 has holes 148 and 150, and side 116 has holes 152 and 154, extending therethrough at a precise location distance from their upper and lower end edges and from their back edges so that holes 148 and 150 of one unit are respectively aligned with holes 152 and 154 of another unit, to be able to insert bolts therethrough to assemble one unit 110 to the side of another unit 110 and attach them together to form a larger unit.

It is preferable that the comparable holes of tops 12 and 112 and the comparable bottom holes of bottoms 38 and 138, and the comparable holes of sides 14 and 114 and sides 16 and 116 be so alignable so that a plurality of units 10 and 110 can be interchangeably assembled into a larger multi-unit configuration, either vertically or horizontally or both as may be desired. Such multi-unit configurations are shown in FIGS. 10 and 11 by way of example, and are further described below. Thus, the differing specifics of units 10 and 110 would not limit them to being assembled interchangeably to form multi-unit configurations. This would not tend to make one type of unit obsolete relative to the other type should an owner of both types decide to so connect them. Other hole position arrangements may be made, so long as they are able to be placed in alignment for fastening two or more individual units together.

Back 118 has holes 151 and 153 in its upper corners, similarly located at the precise location distance. These holes are provided for mounting unit 110 to a wall or pegboard or other vertical surface.

Units, whether all being of the unit 10 or unit 110 type, or a mixture of both types, may be assembled and fastened together both vertically and horizontally to form larger units having two, three, four or more individual units, as may be desired. This can be desirable when different brands of cards 800 are being sold, for example, or in the case of collectible cards, many more can be displayed and readily available for sale.

FIGS. 8, 9, 10 and 11 schematicly illustrate various examples. These figures are simplified line-drawing illustrations provided to illustrate various aspects and versatility of units embodying the invention. Because the various individual units can be of any of the types herein disclosed, a higher series of reference numbers is used in FIGS. 8–11, it being understood that any of the modifications herein disclosed may be so arranged. Any of the individual units of FIGS. 8–11 may or may not have a hinged cover such as shown in FIG. 6 or FIG. 7, as well as in FIGS. 12 and 13, to be later described. Even if some or all of the units are considered to have covers, for simplicity all of the individual units in FIGS. 8–11 are shown without a cover, so that the card 800 positions may be more readily seen.

FIG. 8 schematicly shows a single-bin individual unit 300 made in accordance with FIGS. 1–6 or FIG. 7 and the descriptions of those figures. FIG. 9 shows a double-bin individual unit 400 made in accordance with FIGS. 1–6 or FIG. 7 and the descriptions of those figures. FIG. 10 shows a triple-bin unit 500 having two of the single-bin units 300 secured on the top in spaced relation to each other to form a larger unit 600. FIG. 11 shows two triple-bin units 500 on a first level with two more such units 500 attached thereto on a second level, secured together to form a larger unit 700.

In each instance of attachment of one individual unit to another individual unit, the fastening members 310 are schematicly shown, holding any two adjacent individual units together, whether they are connected horizontally or vertically.

Various heights of stacks of cards 800 are shown in various ones of the bins. It is clear that the various stacks of cards 800 may be inserted through the upper part of the T-shaped opening of each bin, and are then accessible through the lower, vertically-extending part of the T-shaped opening so as to be individually easily removable by a finger lifting one card 800 end up until it clears the vertical T-shaped opening and can be removed out of the horizontally extending upper part of the T-shaped opening.

Referring again to FIG. 7, each bin interior 156, 158 and 160 has a horizontal cross section area which will accommodate the particular cards 800 being sold. For example, typical prepaid telephone calling cards 800 currently being marketed are about 3.5 inches by 2.5 inches; therefore, when designed for use with such typical telephone cards, the bin interiors are only slightly larger than that.

Each pair of adjacent panels 130 and 132, 132 and 134, and 134 and 136, all of which combined are front panel 137, are respectively spaced apart at their lateral edges to respectively create finger/thumb accessible spaces 124, 126 and 128 by a distance best determined as that which will readily admit the insertion of a sales person's thumb and a finger to grip a single card 800 (as seen in FIGS. 8–11) and remove it by lifting it upwardly until it can be removed through the bin upper portion 162, 164 or 166 of the bin containing the card 800 being removed. A typical spacing width between adjacent panels can be about 0.8 inch to 1.2 inches for this purpose. By limiting the filling of bins 162, 164 and 166 to a level below the upper edges of the intermediate panels 130, 132, 134 and 136, those panels prevent any of the cards 800 stored within the bins behind the panels from sliding out.

Years of experience in the telephone card vending industry and input from many vendors, retailers and distributors indicate that, for some such sellers there is a divided opinion on the need for a lockable cover, many preferring that there always be instant card availability for quick sales even at the risk that some cards may be stolen, while others prefer the availability of a lockable cover. Thus, a lockable cover may not be provided at the purchaser's specific request. There is also a general objection to providing the bottom of a unit with suction cups, sticky material or hook-and-loop Velcro™ type fasteners with the idea of temporarily securing the unit to a counter top.

There are also objections to having several individual units sitting on a counter, any one of which is easily removed by an unauthorized person. When there are several such individual units that are not connected together to form a larger unit such as larger unit 600 of FIG. 10 or larger unit 700 of FIG. 11, for example, they become rearranged into a random sequence instead of a predetermined order so that a particular card of a particular value is not quickly located by the salesperson.

These objections are met by having a desired number of bins provided in a single larger unit such as larger units 600 or 700 of FIGS. 10 and 11. Such a unit eliminates those objections, provides for secure mounting off of the sales counter, and allows the provision of one larger unit made of several smaller units secured together. The smaller individual units such as units 300 or 400 or 500 of FIGS. 8–11 are then kept in the desired arrangement for easy location. Any desired larger unit may be created or incrementally increased in storage capacity by adding one or more individual units to the larger unit as sales and other considerations indicate the need.

Unit 110 of FIG. 7 is provided with a lockable cover 170 similar to cover 70 shown in FIG. 6. Like cover 70, cover 170 can be added to or omitted from any individual unit when the vendor requires it. The cover 170 is shown as being suitably attached by a piano hinge assembly 172 to the top 112. This is preferably accomplished by having the piano hinge assembly alternate pivotal sections 186 be formed as a part of a strip 192, and the other alternate pivotal sections 190 be formed as a part of a strip 194, with a hinge pin or shaft 196 extending through both sets of hinge pivotal sections to allow hinging action. Strips 192 and 194 are provided with a suitable adhesive (which may be covered until the hinge is to be installed, and then peeled away to expose the adhesive) which secures hinge strip 192 to the underside of the top 112 so that the hinge pivotal sections are adjacent to but located outwardly of the end surface 196 of top 112, and the hinge strip 192 is similarly secured to the underside of cover 178 adjacent to but outwardly of the cover end surface 198.

Continuing now with FIGS. 12 and 13, cover 170 is preferably of a size to cover substantially all of the front portions of the bin interiors 156, 158 and 160. The locking mechanism 174 is schematically shown as a lock portion 176 operated by a key 178 in the same manner that locking mechanism 74 is operated in unit 10, controlling a shaft 177 (see FIGS. 12 and 13) which has a lock arm 200 secured thereto.

FIGS. 12 and 13 schematically show covers 70 or 170 in a side view of the unit of which they are a part. For simplicity, the illustrations in these two FIGURES will use the same reference characters as those used in FIG. 7, it being understood that the arrangement is also equally applicable to the arrangement shown in FIG. 6.

Cover 170 is hinged by hinge 172 to the top 112 and is shown in the closed, but not yet locked, position. The locking mechanism 174 extends along axis 175 of its shaft 177 on which the lock arm 200 is secured. Lock arm 200 is illustrated as a simple arm extending laterally, and movable in the same manner as lock arm 82 of unit 10. In the unlocked position, lock arm 200 is positioned to extend either above or below the axis 175 of the locking mechanism shaft as shown in FIGS. 7, 12 and 13. It is preferable that it extends above the lock shaft axis 175 when in its unlocked position, as shown in FIG. 7, so that it will permit a greater number of cards 800 to be located in bin 158 without its touching those cards 800 while being moved between its locked and unlocked positions than it will permit if it extends below the shaft axis 175 while in the vertical, unlocked, position. However, for schematic purposes, it is shown in FIGS. 12 and 13 to extend below the shaft axis 175 when in its unlocked position. When in the unlocked position with the cover 170 closing the bins, lock arm 200 is positioned within the finger slot 126 formed by the adjacent edges of panels 132 and 134. When the key 178 is turned, it moves the arm through about 90 degrees of arc so that the lock arm 200 is moved to a position behind one or the other of the panels 132 and 134, and the lock is secured in this position. The key then is removed. The stack of cards 800 in the bin interior 158 must always be sufficiently low so that the locking arm does not engage the top card 800 of the stack when it is in either the unlocked or the locked position.

To open the cover, the key 178 is inserted in the lock portion 176, turned 90 degrees until the locking arm extends upwardly (or downwardly if that is the way it is installed) until it is clear of the panel 130 or 132 that it engaged when locked, and the cover 170 is released. Cover 170 is then pivoted on its hinge 172 so as to provide access to the bins 156, 158 and 160. It may be moved beyond the vertical so as to rest over at least a part of the unit top 112 when there is no other unit connected to the unit's top.

As to the differences between units 10 and 110, top 112, back 118, bottom 138, and the front panel 137, comprising the intermediate panels 130, 132, 134 and 136, are formed from one piece of plastic. Top 112 and back 118 are connected by a radius bend 201, back 118 and bottom 138 are connected by a radius bend 202, and bottom 138 is connected to each of the intermediate panels 130, 132, 134 and 136 respectively by radius bends 204, 206, 208 and 210. Side or end panels 114 and 116 are each formed as flat planar members, with their corners which are located at radius bends 201 and 202, and 204 in the case of panel 114 and 208 in the case of panel 116, being relieved or cut back slightly, as shown at 212, 214 and 216 of panel 114. Panels 114 and 116 are also cut back as shown at 218 of panel 114 to permit the panels 130 and 136 to have their outer surfaces 224 and 226 in substantial planar alignment with the end surface sections 228 and 230 of end panels 114 and 116.

In order to provide for a card 800 display, a strip 232 is provided. Strip 232 is shown in FIG. 14 as being formed in cross section like an almost closed "J" with a flat first body section 822 forming the main part of the "J" that preferably has an adhesive on its side 824. Strip 232 is attached by its adhesive either to the inner side of the cover 170, as shown in FIG. 12, or to the inner side of the unit back side 118 as shown in FIG. 13, or a strip 232 is so attached to each of these inner sides, as shown in FIG. 7. Strip 232 has a second body section 826 extending from section 822 to form the bottom part of the "J." A third body section 828 extends from section 826 back toward section 822. Its outer end (as seen in cross section) is reversely bent at 832 to provide a contact line 834 extending the length of the strip 232. The strip 232 is preferably made of a plastic material that has a spring action in its body sections so that the contact line, in the relaxed condition, is either in contact with surface 836 of strip body section 822 or very close to it so that the space therebetween is substantially less than the thickness of a card 800. Strip body sections 822, 826 and 828 define a slot 830 extending the length of the strip and having a potential narrow opening 840 between the contact line 834 and the surface 836 of the body section 822.

One end 838 of a card 800 is inserted in slot 830 by pushing it through the opening 840, moving the contact line against the spring action of body sections 828 and 826 while engaging the card end 838 in sufficient gripping relation to prevent the card being displayed from moving out of the slot while the unit is being moved or the unit cover is being opened and closed. The side of the card desired to be seen by customers is placed against the inner surface of the back side 118 and/or the inner surface of the cover 170 so that it may be observed and any written information thereon be read. When multi-bin units are used, a card can be placed above each set of cards in each bin to identify them, both to the customers and the clerks selling them.

When the strip 232 is mounted on the inner (under) side of the cover 70 of unit 10 or 170 of unit 110, the locked cover faces the consumer public and the faces of the card or cards 838 inserted in the strip above each of the bins face the public as well, and can be readily seen through the transparent cover. This is preferable when the unit is to be seated or mounted behind the counter, whether on a back counter surface, a wall or other vertical surface.

When the strip 232 is mounted on the interior side of the back 14 or 114 of the unit 10 or 110, the back is positioned to face the consumer public, with the card faces being visible through the transparent back. This has the advantage of keeping the cover facing toward the salesperson behind a counter when the unit, with cards, is seated on or secured to the top of a counter.

Units 10 and 110 are illustrated as having three bin interiors 56, 156; 58, 158; and 60, 160. It is within the purview of the invention that units may be made having a single or a double bin interior when lateral counter space is at a premium and narrower units are desired. Likewise, units may be made with more than three bin interiors, up to any practical number for the particular installation intended. Single or double bin interior units may be attached to units having a matching number of bin interiors or more or less bin interiors, both laterally and vertically, providing a wide variety of unit presentations. Some of these arrangements are illustrated in FIGS. 8–12.

While the unit 10 of FIGS. 1–6 is shown as being made of several flat-surface panels which are assembled together, unit 110 of FIG. 7 is schematicly illustrated in FIG. 15 as being made by use of a jig 900 having heated pipes or rods 902, 904 and 906 arranged to form thereabout the curved radius bend corners 201, 202 and 204, shown in FIG. 15, and the radius bend corners 206, 208 and 210 shown in FIG. 7 but not shown in that FIG. 15 because of the view. Unit top 112, back 118, bottom 138 and the front panel 137, which may include the intermediate panels 130, 132, 134 and 136, are parts of a single plastic part 908 which is cut from flat thermoplastic sheet stock using a flat pattern, with the plastic having the characteristic of becoming pliable within a suitable range of temperature so as to be easily bent around the pipes or rods to form the various radius bend corners. Such ranges of temperature are well known characteristics of various thermoplastic materials that may be used, and are somewhat different for each such plastic. The flat pattern stock is preferably laser cut under computer control to obtain very precise dimensions of the single plastic part 908, as are the other panels 114, 116, 120 and 122 and the cover 170.

The pipes or rods 902, 904 and 906 in the jig 900 may be heated in any suitable manner so as to be substantially uniformly heated within the pliable temperature range of the particular plastic being used. Examples may be the circulation of a suitable heated liquid or gas such as air through pipes, or electrical resistance heating units within the pipes or as a part of rods. Such rods may be electrically similar to some electric range or water heater heating elements.

When heated liquid is used, it may simply be water, or any other appropriate fluid which does not boil when heated to a temperature within the pliable temperature range of the plastic being used. If that temperature range is above the boiling point of the liquid, the liquid may be gaseous, such as steam from water. When a liquid or gas, including heated air, is used within pipes, it should be circulated through the pipes so as to maintain the pipes at a desired temperature within that pliable temperature range.

The flat patterned part 908 is placed on the jig 900, and bent around the pipes or rods 902, 904 and 906 so that the inner radii of the radius bend corners are established by the radii of the outer surfaces of the pipes or rods used to form a particular radius bend corner 204, 206 and the group of radius bend corners joining the bottom 138 with the front panel 137 formed by intermediate panels 130, 132, 134 and 136. The bending to form these radius bend corners may be easily automated for high volume production. This process also provides the simplest operation as a whole, making less individual parts than when made as shown in FIGS. 1–5, or the injection molding process described immediately below.

Alternatively, directed heat sources from outside the jig 900 may be used to heat the plastic part 908 at the immediate areas where it engages each pipe or rod, thus only heating the portion of the part 908 to be bent while in a pliable state, even as the heating by pipes or rods does.

A simplified schematicly shown form 910 much like part of a die may be provided which moves against the part 908 in the direction of arrow 912 to first cause the bending at pipe or rod 902 in the direction of arrow 914, and the bending at pipe or rod 904 in the direction of arrow 916 to form radius bend 206, and then to further move the portion of part 908 which is to become the panels of front 134 in the direction of arrow 918 to cause the bending at pipe or rod 906 to form radius bends 208, 210, 212 and 214 where the front panel portions 130, 132, 134 and 136 join the bottom 138, assuming of course that a three-bin unit such as that shown in FIG. 7 is to be made.

The jig 900 preferably has flat panels 920, 922, 924 and 926 joining pipes or rods 902, 904 and 906 as well as an unheated pipe or rod 928 to provide support for the flat portions of 908 as they are bent to the required 90° degrees of arc, and to prevent bending them beyond the desired 90° of arc.

Once the part formed by the above-described radius-bending process is formed, and is cooled in any of the manners earlier described, so that the plastic is no longer pliable, the now bent part is removed from the jig and the various panels are assembled in place and secured by a suitable adhesive. If a suitable liquid is used to heat the pipes, it may have a separate liquid system which is cooled and cooled liquid may be circulated through the pipes after the radii bending process steps are completed to quickly bring the temperature of the plastic part below that at which the plastic is pliable. The finished unit structure is preferably removed from the jig after it has been sufficiently cooled at the bend points so that it is no longer thermoplasticly pliable, and has become structurally stable to retain the shape to which it has been bent.

A slight modification of the unit 110 lends itself to being injection molded. When this process is to be used, a unit comprising the back 118, bottom 138, and the panels 130, 132, 134 and 136, but not the top 112, is easily injection molded by mold portions shaped to the interior and the exterior of the finished unitary part. In this instance, the radius bend 204 becomes an abutment connection rather than having a radius, much like the attachment of the top 12 to the back 18 and end panels 14 and 16 of unit 10, and the top 112 is attached by a suitable adhesive to the top edges of the back 118 and the end panels 114 and 116. If a cover 170 is to be provided, it may be adhesively secured to the top 170 either before or after that top is secured to the noted top edges. This process using a combination of injection molding and flat sheet stock patterned panels decreases the laser cutting operation in that the formed unit is not made from a patterned laser cut sheet stock requiring the laser cutting operation on several panel parts such as is used to make the back 118, bottom 138, and panels 130, 132, 134 and 136. Depending primarily upon manufacturing costs and volume of production, one or the other of the various processes described may be utilized.

It is desired that units being made in accordance with the invention herein disclosed and claimed be of a suitable shock and impact resistant material. High Density Propylene has been found to be such a suitable material. It is also preferred that its parts have a basic thickness of about 3/16 inch. This combination of material and thickness makes a stronger, high impact resistent, unit with a decided advantage over the typical easily breakable 1/8 inch very simple acrylic containers being currently marketed, and even more so over the cardboard containers. Even acrylic units with a considerably greater thickness than that used in similar currently marketed display units have much of this same decided advantage, although they are not as highly resistent to impact cracking or breakage as are units made of High Density Propylene. Other plastic materials such as nylon or Lucite™ may also be used. Some materials that may be used lend themselves to injection molding or individual panel construction but are thermosetting, and therefore not amenable to thermoplastic pliability and bending.

While not shown, edge lighting of some plastics, and particularly Lucite™, can cause parts of the unit, or the entire unit, to be lighted up in any desired color or in substantially white light. Such lighting can attract the attention of customers by making the unit and the cards in it more visible.

It is strongly desired that the unit be made of substantially transparent material. If made in several parts as shown in FIGS. 1–6, it is important that the panels 26, 28, 30, 32, and even more so panel 34, be transparent to the same extent. Other portions can be translucent, opaque, different colors, etc. if desired, so long as the customer can view the entire selection of cards 800.

When there are several units, filled with different cards 800, the customer can easily see a wider choice of cards. This choice is particularly desirable because some cards have definite cost advantages over others when used in calling particular markets. This is even more true in the various international calling markets. Customers quickly become aware of these cost differences on a number-of-minutes basis together with certain additional charges, and a wide selection is therefore very desirable. Many vendors will stock two or three, or even as many as eight or ten different cards. When other types of cards, such as baseball cards, are being sold, the display of as many choices as possible is desired.

While the units embodying the invention may be used as free-standing units sitting on a sales counter, a shelf or the like, they are particularly adapted to be located behind a sales counter, probably near a cash register, so that the sales person has ready access to the cards in the unit but potential customers do not. The vendor must treat activated telephone cards, collectible cards, etc., exactly as if they were cash money. Therefore, while it is desirable that they be visible to potential customers and at the same time readily available to the person handling their sales, they must be relatively secure. By locking the cards 800 within the unit, security is improved considerably. The preferred behind-the-counter location will still usually be sufficiently close to the customer that the type of card 800 in each bin can be readily identified.

What is claimed is:

1. A storage and display unit array formed by a combination of a plurality of individual storage and display units secured together, at least a first one of said individual storage and display units comprising:

a unit body having a bottom, a back side, a top, left and right side panels, and a front side, said front side having at least one generally T-shaped opening having an upper part extending across at least a portion of said front side and a lower part extending downwardly from said upper part so as to terminate at least near to said unit body bottom, said T-shaped opening being defined by spaced parts of said front side and opening into the interior of said unit and defining the front of a bin in which a number of cards may be installed therein by insertion through said opening so as to lie flat in said bin, and may be removed by insertion of a finger inserted through said downwardly extending lower part of said T-shaped opening to lift one or more of the cards upwardly in said bin and then outwardly through said across-extending upper part of said T-shaped opening;

said top, bottom, and side panels having fastener-receiving openings therethrough arranged in such matching relation that two or more of said individual storage and display units may be secured together in either vertical or horizontal relation to form said array;

at least a second one of said single storage and display unit more specifically comprising:

another of said first one of said individual storage and display units having divider panels located intermediate said left and right side panels and secured to said back, bottom and front and cooperating with said back, bottom and front to define a plurality of said bins, each of said bins having a T-shaped opening as defined so that different cards may be stored, displayed in and selectively removed from different bins;

each of said individual storage and display units having a hinged lockable cover having a closed position covering said T-shaped openings thereof and being movable to an unlocked open position wherein said T-shaped openings thereof are uncovered to provide access to said bins through said T-shaped openings to permit the insertion and removal of cards into and out of said bins thereof;

the particular overall appearance and arrangement of said storage and display unit array being controlled at least in part by the number of bins in each of said individual storage and display units, the placement of various individual storage and display units relative to each other, and the material of which any particular individual storage and display unit is made.

2. A storage and display unit adapted to hold, display and permit removal of cards and similar-sized merchandise for sale and adapted to be attached to one or a plurality of other of said units to form in combination a multi-unit storage and display unit array, said unit comprising:

a unit body having at least a first bottom, a vertically extending back side, a top, vertically extending left and right side panels and a vertically extending front side, said back side, top, bottom and front side defining at least one bin between said left and right side panels, each said bin having vertically extending left and right sides and a front portion defined by said front side, said front side having spaced parts defining at least one generally T-shaped opening having an upper opening part extending horizontally across at least a portion of said front side and a lower opening part extending vertically downward from said upper opening part so as to terminate at least near to said unit body bottom, said lower opening part having a width only sufficient to insert a finger or thumb or both therein in a gripping action for upwardly moving and removing a card or similar-sized merchandise from said bin, said T-shaped opening being open to the interior of said unit and, together with said front side, defining said front portion of said bin through which a number of cards or similar-sized merchandise may be installed therein by insertion through said upper opening part so as to lie flat in said bin operatively on said unit body bottom, and may be removed by insertion of at least one finger inserted through said lower opening part of said T-shaped opening to lift one or more of the cards or similar-sized merchandise upwardly in said bin and then outwardly through said upper opening part of said T-shaped opening;

said first bottom being the bottom of said at least one bin, wherein a second bottom forming a storage shelf is provided below said first bottom and wherein said back and side panels and said front extend below said first bottom and have said storage shelf formed by said second bottom secured thereto, access to said storage shelf opening through one of said back panel and front extensions on the back or front of said unit so as to have access to said storage shelf only on the side thereof which is normally oriented to face a clerk and not a customer to deter theft of any item on said openable storage shelf by a customer or another member of the general public.

3. A storage and display unit adapted to hold, display and permit removal of cards and similar-sized merchandise for sale and adapted to be attached to one or a plurality of other of said units to form in combination a multi-unit storage and display unit array, said unit comprising:

a unit body having at least a first bottom, a vertically extending back side, a top, vertically extending left and right side panels and a vertically extending front side, said back side, top, bottom and front side defining at least one bin between said left and right side panels, each said bin having vertically extending left and right sides and a front portion defined by said front side, said front side having spaced parts defining at least one generally T-shaped opening having an upper opening part extending horizontally across at least a portion of said front side and a lower opening part extending vertically downward from said upper opening part so as to terminate at least near to said unit body bottom, said lower opening part having a width only sufficient to insert a finger or thumb or both therein in a gripping action for upwardly moving and removing a card or similar-sized merchandise from said bin, said T-shaped opening being open to the interior of said unit and, together with said front side, defining said front portion of said bin through which a number of cards or similar-sized merchandise may be installed therein by insertion through said upper opening part so as to lie flat in said bin operativley on said unit body bottom, and may be removed by insertion of at least one finger inserted through said lower opening part of said T-shaped opening to lift one or more of the cards or similar-sized merchandise upwardly in said bin and then outwardly through said upper opening part of said T-shaped opening;

said storage and display unit having a cover hinged to said top for swingable movement from a vertical position in which said at least one T-shaped opening is covered by said cover to an open position in which said at least one T-shaped opening is at least sufficiently open and uncovered by said cover so as to permit the installation and removal of cards and similar-sized merchandise into and from said bin, said cover having a key-operated security lock thereon with a movable locking bar movable in one direction about an axis of said lock by key action only from an unlocked position to a locked position and in the opposite direction from a locked position to an unlocked position, said locked position being such position that said lock axis extends through at least one of said at least one T-shaped opening and said locking bar engages the bin interior side of at least one of said spaced parts of said front defining said at least one T-shaped opening while said cover is in its said vertical position covering said at least one T-shaped opening, and said lock bar being movable by said key lock in the opposite direction to a position wherein it is disengaged from said at least one of said spaced parts of said front defining said at least one of said at least one of T-shaped opening and is in alignment with at least one of said opening parts of said at least one of said at least one of said T-shaped opening so as to permit said cover to be swung to said open position wherein said at least one T-shaped opening is uncovered to permit the installation and removal of cards and similar-sized merchandise into and from said bin, said lockable and unlockable cover thus keeping said cards and similar-sized merchandise secure from inadvertent or intentionally impermissible removement from said bin.

4. The storage and display unit of claim 3 wherein said bar extends to only one side of said lock axis and is therefore engageable with and disengageable from only one of said at least one of said spaced parts of said front defining said T-shaped opening and is rotated only about 90° in arc from its engageable position to its disengageable position.

5. The storage and display unit of claim 3 wherein said bar extends to both sides of said lock axis and has an engageable position and a disengageable position relative to said spaced parts of said front defining said at least one T-shaped opening and is rotated about 180° in arc from said bar engageable position to said bar disengageable position.

6. The storage and display unit of claim 5 wherein said bar is formed substantially as a semi-circle and in its unlocked position is above said lock axis so as to be in alignment with said at least one of said at least one T-shaped opening upper part and in said bar disengageable position relation with said spaced parts of said front side defining said at least one of said at least one T-shaped opening, and in its locked position extending below said lock axis so as to be in engageable relation with both of said spaced parts of said front side defining said at least one of said at least one T-shaped opening, preventing swinging movement of said cover to uncover said at least one T-shaped opening.

7. The storage and display unit of claim 3 wherein a card or other similar-sized merchandise-retainable strip is secured to said cover on the side thereof facing said bin when said cover is covering said at least one T-shaped opening, permitting one side of a card or other similar-sized merchandise retained therein to be visually observed by a customer through said cover while said cover covers said at least one T-shaped opening, any cards or other similar-sized merchandise in said bin being accessible to a clerk because said bin in openable only by a clerk having a key for operating said key lock, thereby providing security against unauthorized removal of a card or other similar-sized merchandise from said bin.

8. The storage and display unit of claim 3 wherein a card or other similar-sized merchandise-retainable strip is secured to said unit back on the side thereof facing said bin, permitting one side of a card or other similar-sized merchandise retained therein to be visually observed through said back, so that said back may be the side of said unit seen by a customer and the closed cover being the side being accessible to a clerk and openable by a clerk having a key for operating said key lock, thereby providing greater security against unauthorized removal of a card from said bin by making removal to be accomplished only on the part of said storage and display unit which is not readily accessible to a customer.

9. A larger storage and display unit formed by a combination of individual units as defined in claim 3 which are secured together by fastening means extending through at least some openings formed in said sides, top and bottom of two adjacent ones of such units that are aligned with each other for the passage of fastening means therethrough.

* * * * *